(12) United States Patent
Shen et al.

(10) Patent No.: US 11,552,766 B2
(45) Date of Patent: Jan. 10, 2023

(54) METHOD FOR DATA TRANSMISSION, TERMINAL DEVICE AND NETWORK DEVICE

(71) Applicant: GUANGDONG OPPO MOBILE TELECOMMUNICATIONS CORP., LTD., Guangdong (CN)

(72) Inventors: Jia Shen, Guangdong (CN); Zhenshan Zhao, Guangdong (CN); Yanan Lin, Guangdong (CN); Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 78 days.

(21) Appl. No.: 17/161,561

(22) Filed: Jan. 28, 2021

(65) Prior Publication Data
US 2021/0152314 A1 May 20, 2021

Related U.S. Application Data

(63) Continuation of application No. PCT/CN2018/098474, filed on Aug. 3, 2018.

(51) Int. Cl.
*H04L 5/00* (2006.01)
*H04W 72/04* (2009.01)

(52) U.S. Cl.
CPC .......... *H04L 5/0053* (2013.01); *H04L 5/0094* (2013.01); *H04W 72/042* (2013.01); *H04W 72/0413* (2013.01); *H04W 72/0453* (2013.01)

(58) Field of Classification Search
CPC ............... H04L 5/0044; H04L 5/0094; H04W 72/1263; H04W 72/1289; H04W 72/0453; H04W 72/042; H04W 72/0413
See application file for complete search history.

(56) References Cited

U.S. PATENT DOCUMENTS

2017/0208627 A1* 7/2017 You ................... H04W 72/0446
2017/0230994 A1   8/2017 You et al.
(Continued)

FOREIGN PATENT DOCUMENTS

| CN | 106686728 A | 5/2017 |
| CN | 107241805 A | 10/2017 |

(Continued)

OTHER PUBLICATIONS

Huawei et al. "Views on NR URLLC work in Rel-16" 3GPP TSG RAN Meeting #80 RP-180889, Jun. 14, 2018 (Jun. 14, 2018), sections 2.5 and 2.6.
(Continued)

*Primary Examiner* — Ayaz R Sheikh
*Assistant Examiner* — Debebe A Asefa
(74) *Attorney, Agent, or Firm* — Perkins Coie LLP

(57) ABSTRACT

Disclosed is a method for data transmission. The method includes: a terminal device receiving a first downlink control information (DCI) and second DCI scrambled with different radio network temporary identities (RNTIs), the first DCI comprising a first resource allocation information for a first channel, and the first resource allocation information indicating a first resource region, and the second DCI comprising a second resource allocation information for the first channel, and the second resource allocation information indicating a second resource region; and the terminal device determining that the first channel scheduled by the second DCI is transmitted in a third resource region, the third resource region being a resource region, except an overlapping resource region between the first resource region and the second resource region, in the second resource region. Further disclosed are a terminal device and a network device.

17 Claims, 6 Drawing Sheets

FIG. 1

(56) References Cited

U.S. PATENT DOCUMENTS

2018/0199268 A1* 7/2018 Wang .................. H04L 5/0053
2019/0191453 A1* 6/2019 Xiong .................. H04L 5/0055
2020/0162212 A1   5/2020 Liu et al.

FOREIGN PATENT DOCUMENTS

WO    2017209585 A1    12/2017
WO    2018126401 A1    7/2018

OTHER PUBLICATIONS

International Search Report in the international application No. PCT/CN2018/098474, dated Apr. 30, 2019.
Supplementary European Search Report in the European application No. 18928690.9, dated Jun. 29, 2021. 9 pages.
Written Opinion of the International Search Authority in the international application No. PCT/CN2018/098474, dated Apr. 30, 2019. 6 pages with English translation.

* cited by examiner

METHOD FOR DATA TRANSMISSION, TERMINAL DEVICE AND NETWORK DEVICE

CROSS-REFERENCE TO RELATED APPLICATION

This application is a U.S. continuation application of International Application No. PCT/CN2018/098474, entitled "DATA TRANSMISSION METHOD, TERMINAL DEVICE, NETWORK DEVICE AND STORAGE MEDIUM", filed on Aug. 3, 2018, the disclosure of which is hereby incorporated by reference in its entirety.

BACKGROUND

A 5th Generation (5G) New Radio (NR) system supports both an Enhance Mobile Broadband (eMBB) service and an Ultra Reliable & Low Latency Communication (URLLC) service. When resources allocated to the eMBB service and resources allocated to the URLLC service overlap in a frequency domain or in a time-frequency domain, there is yet no solution for how to allocate the overlapping resources to implement effective resource utilization and to improve an efficiency and reliability in data transmission.

SUMMARY

For solving the foregoing technical problem, embodiments of the disclosure provide a method for data transmission, a terminal device and a network device. When resources allocated to an eMBB service and resources allocated to a URLLC service overlap in a frequency domain or in a time-frequency domain, effective resource utilization may be implemented, and the data transmission efficiency and reliability may be improved.

According to a first aspect, the embodiments of the disclosure provide a method for data transmission, which includes the following operations. A terminal device receives a first Downlink Control Information (DCI) and second DCI scrambled with different Radio Network Temporary Identities (RNTIs). The first DCI includes a first resource allocation information for a first channel, and the first resource allocation information indicates a first resource region. The second DCI includes a second resource allocation information for the first channel, and the second resource allocation information indicates a second resource region. The terminal device determines to transmit the first channel scheduled by the second DCI in a third resource region. The third resource region is a resource region, except an overlapping resource region between the first resource region and the second resource region, in the second resource region.

According to a second aspect, the embodiments of the disclosure provide a terminal device, which includes a processor, a memory for storing a computer program executable by the processor, and a network interface. The processor is configured to run the computer program to control the network interface to receive a first DCI and second DCI scrambled with different RNTIs. The first DCI includes a first resource allocation information for a first channel, and the first resource allocation information indicates a first resource region. The second DCI includes a second resource allocation information for the first channel and the second resource allocation information indicates a second resource region. The processor is configured to determine to transmit the first channel scheduled by the second DCI in a third region resource. The third resource region is a resource region, except an overlapping resource region between the first resource region and the second resource region, in the second resource region.

According to a third aspect, the embodiments of the disclosure provide a network device, which includes a processor, a memory for storing a computer program executable by the processor, and a network interface. The processor is configured to run the computer program to control the network interface to send a first DCI and second DCI scrambled with different RNTIs.

The first DCI and the second DCI are used for a terminal device to determine a resource adopted to transmit a first channel scheduled by the second DCI. The first DCI includes a first resource allocation information for the first channel, and the first resource allocation information indicates a first resource region. The second DCI includes a second resource allocation information for the first channel, and the second resource allocation information indicates a second resource region.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Before the embodiments of the disclosure are described in detail, allocation methods for overlapping resources under the condition that a resource allocated to an eMBB service and a resource allocated to a URLLC service overlap in a frequency domain or in a time-frequency domain in the related art are described at first.

A first allocation method for the overlapping resources is as follows.

Figure 1:
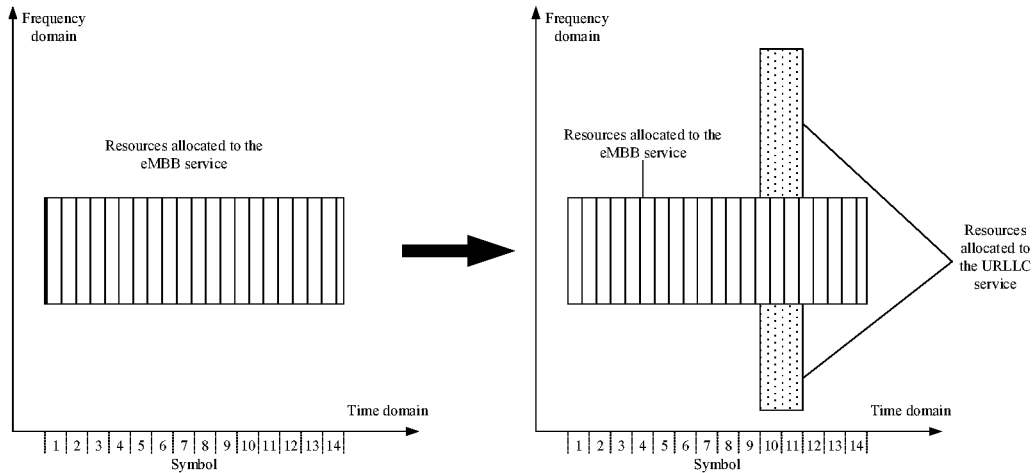
FIG. 1 is a schematic diagram of a first resource allocation method in a related art according to an embodiment of the disclosure.

When the resource allocated to the eMBB service and the resource allocated to the URLLC service overlap, a frequency-domain resource left after scheduling of the eMBB service is adopted for the URLLC service. As shown in FIG. 1, the resource allocated to the eMBB service occupies a slot, i.e., 14 symbols, in a time domain. The frequency-domain resource left after scheduling of the eMBB service in the symbol 10 and the symbol 11 is allocated to the URLLC service.

Figure 2:
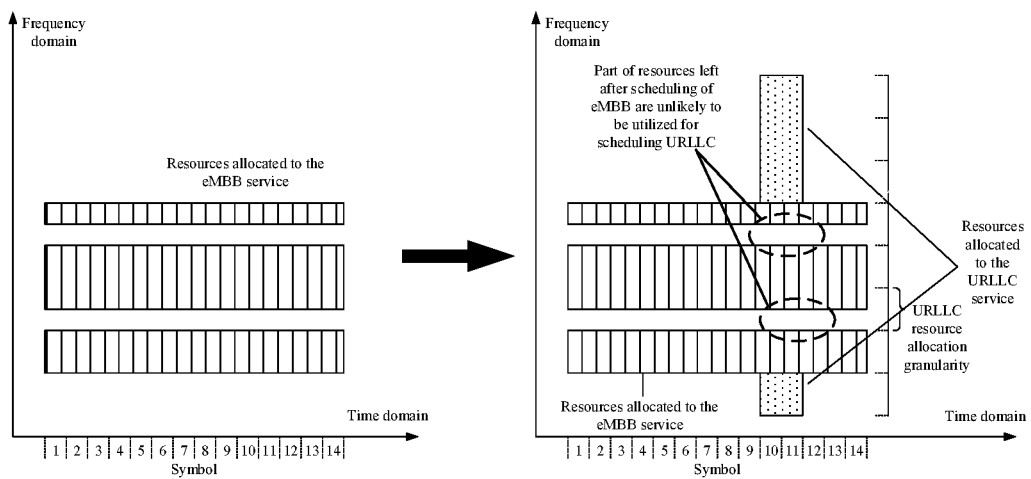
FIG. 2 is a schematic diagram of resource allocation based on a first resource allocation method according to an embodiment of the disclosure.

However, when the first allocation method is implemented, it is found that, for the pursuit of a high reliability of the URLLC service, a DCI overhead is required to be reduced as much as possible to reduce a coding rate for the DCI. As such, a larger frequency-domain allocation granularity than that for the eMBB service or a continuous resource allocation is required to be adopted for the URLLC service. In the first allocation method, as shown in FIG. 2, the frequency-domain resource allocated to the URLLC service and left after scheduling of the eMBB service may not be fully utilized by the URLLC service, resulting in resource waste.

A second allocation method for the overlapping resources is as follows.

Figure 3:
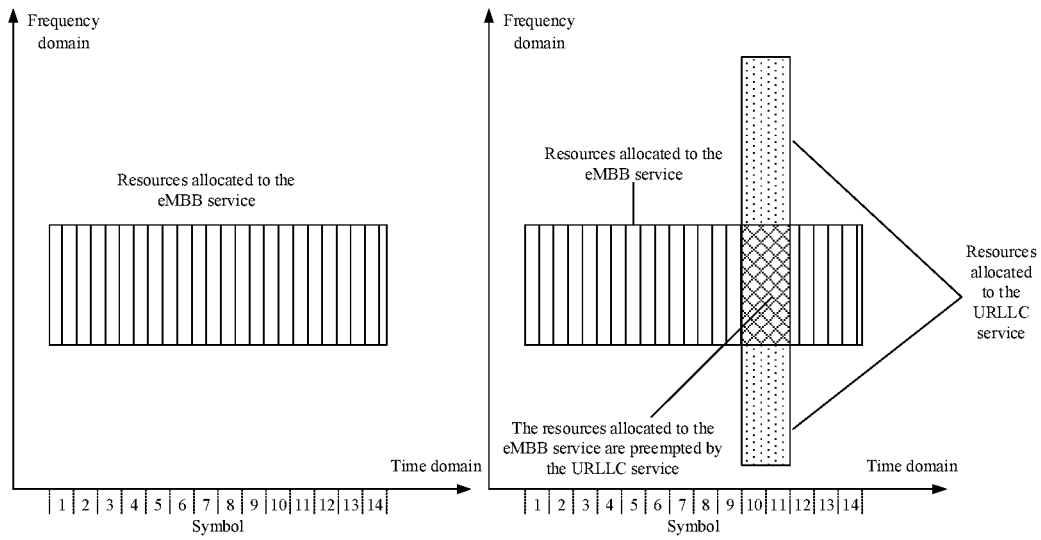
FIG. 3 is a schematic diagram of a second resource allocation method in the related art according to an embodiment of the disclosure.

When the resource allocated to the eMBB service and the resource allocated to the URLLC service overlap, a frequency-domain resource allocated to the eMBB service is preempted by the URLLC service. As shown in FIG. 3, the resource allocated to the eMBB service occupies a slot, i.e., 14 symbols, in the time domain. As many frequency-domain resources as possible in the symbol 10 and the symbol 11 are allocated to the URLLC service, and the overlapping frequency-domain resources allocated to the URLLC service and the eMBB service are preempted by the URLLC service, which is also called "pre-emption".

However, when the second allocation method is implemented, the applicant finds that, when the overlapping frequency-domain resources are preempted by the URLLC service, a coded block of the eMBB service may be damaged, resulting in a reduction in quality of the eMBB data transmission, eMBB decoding failure and great reduction of the transmission reliability of the eMBB service.

The technical solutions in the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system or a future 5G system.

Figure 4:
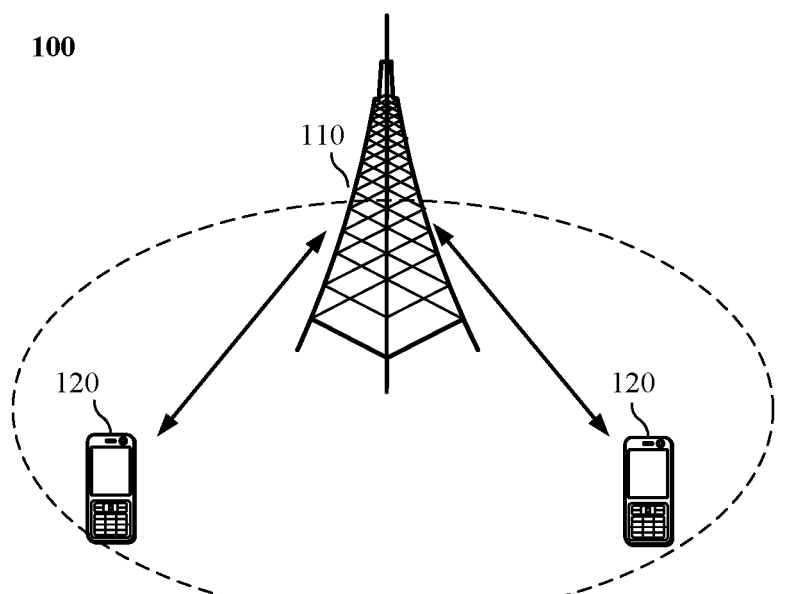
FIG. 4 is a composition structure diagram of a communication system according to an embodiment of the disclosure.

Exemplarily, a communication system 100 that the embodiments of the disclosure are applied to is shown in FIG. 4. The communication system 100 may include a network device 110. The network device 110 may be a device communicating with a terminal device 120 (or called a communication terminal or a terminal). The network device 110 may provide a communication coverage for a specific geographical region and may communicate with a terminal device located in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). The network device may be a mobile switching center, a relay station, an access point, a vehicle device, a wearable device, a hub, a switch, a network bridge, a router, a network-side device in a future 5G network, a network device in a future evolved Public Land Mobile Network (PLMN) or the like.

The communication system 100 further includes at least one terminal device 120 within the coverage of the network device 110. The "terminal device" used herein includes, but not limited to, a device arranged to receive/send a communication signal through a wired line connection, for example, through Public Switched Telephone Network (PSTN), Digital Subscriber Line (DSL), digital cable and direct cable connections, and/or another data connection/network, and/or through a wireless interface, for example, through a cellular network, a Wireless Local Area Network (WLAN), a digital television network like a Digital Video Broadcasting-Handheld (DVB-H) network, a satellite network or an Amplitude Modulated (AM)-Frequency Modulated (FM) broadcast transmitter, and/or through another communication terminal, and/or an Internet of Things (IoT) device. The terminal device configured to communicate through a wireless interface may be called a "wireless communication terminal", a "wireless terminal" or a "mobile terminal." Examples of the mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or another electronic device including a radio telephone transceiver. The terminal device may refer to an access terminal, User Equipment (UE), a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN or the like.

Optionally, the terminal devices 120 may perform Device to Device (D2D) communication with each other.

Optionally, the 5G system or the 5G network may also be called an NR system or an NR network.

A network device and two terminal devices are exemplarily shown in FIG. 4. Optionally, the communication system 100 may include multiple network devices and another number of terminal devices may be included in coverage of each network device. No limits are made thereto in the embodiments of the disclosure.

Optionally, the communication system 100 may further include other network entities such as a network controller and a mobility management entity. No limits are made thereto in the embodiments of the disclosure.

It is to be understood that a device with a communication function in the network/system in the embodiments of the disclosure may be called a communication device. For example, for the communication system 100 shown in FIG. 4, communication devices may include the network device 110 and terminal device 120 with the communication function, and the network device 110 and the terminal device 120 may be the specific devices mentioned above and will not be elaborated herein. The communication devices may further include other devices in the communication system 100, for example, other network entities like a network controller and a mobility management entity. No limits are made thereto in the embodiments of the disclosure.

Figure 5:
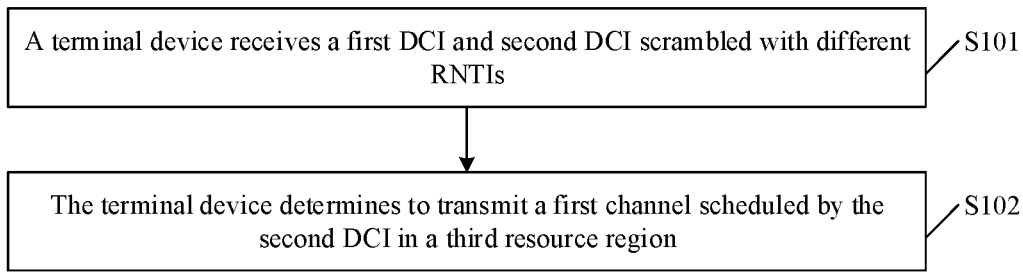
FIG. 5 is an optional processing flowchart of a method for data transmission applied to a terminal device according to an embodiment of the disclosure.

As shown in FIG. 5, an optional processing flow of a method for data transmission applied to a terminal device according to an embodiment of the disclosure is provided, which includes the following operations.

At block S101, the terminal device receives a first and second DCI scrambled with different RNTIs.

In some embodiments, the first DCI is scrambled with a first RNTI, and the second DCI is scrambled with a second RNTI. The first RNTI is a Cell Radio Network Temporary Identifier (C-RNTI), and the second RNTI is another RNTI except the C-RNTI. The first DCI includes a first resource allocation information for a first channel, and the first resource allocation information indicates a first resource region. The second DCI includes a second resource allocation information for the first channel, and the second resource allocation information indicates a second resource region. Both the first DCI and the second DCI are DCI for scheduling downlink resources, or both the first DCI and the second DCI are DCI for scheduling uplink resources.

In the embodiment of the disclosure, a starting transmission time of the first channel scheduled by the first DCI is earlier than a starting transmission time of the first channel scheduled by the second DCI. A frequency-domain allocation unit adopted for the second resource allocation information is larger than a frequency-domain allocation unit adopted for the first resource allocation information. A first resource allocation manner is adopted for the first resource allocation information, and the first resource allocation manner is used to allocate continuous frequency-domain resources or discontinuous frequency-domain resources. A second resource allocation manner is adopted for the second resource allocation information, and the second resource allocation manner is used to allocate continuous frequency-domain resources. In an optional implementation, the first resource region scheduled by the first DCI is allocated to an eMBB service, and the second resource region scheduled by the second DCI is allocated to a URLLC service.

Herein, the first resource region and the second resource region are frequency-domain resource regions, or the first resource region and the second resource region are time-frequency domain resource regions. The first channel is a Physical Downlink Shared Channel (PDSCH), or a Physical Uplink Shared Channel (PUSCH) or a Physical Uplink Control Channel (PUCCH).

At block S102, the terminal device determines to transmit the first channel scheduled by the second DCI in a third resource region.

In the embodiment of the disclosure, the third resource region is a resource region, except an overlapping resource region between the first resource region and the second resource region, in the second resource region. It can be understood that the terminal device allocates the overlapping resource region between the first resource region and the second resource region to the second DCI for scheduling. Therefore, when the first resource region and the second resource region are frequency-domain resource regions, the third resource region is also a frequency-domain resource region. When the first resource region and the second resource region are time-frequency domain resource regions, the third resource region is also a time-frequency domain resource region.

The embodiment of the disclosure also provides a method for data transmission applied to a terminal device. A processing flow of the method is similar to the processing flow of the method for data transmission shown in FIG. 5. A difference is that, before S101, the method further includes the following operation.

At block S100, the terminal device receives a first configuration information from a network device.

In some embodiments, the first configuration information indicates that the RNTI for scrambling the second DCI is available. Optionally, when a value in the first configuration information is a first numerical value, it is indicated that the RNTI for scrambling the second DCI is unavailable, and when the value in the first configuration information is a second numerical value, it is indicated that the RNTI for scrambling the second DCI is available. The method for data transmission in the embodiment of the disclosure is applied to the condition that the value in the first configuration information is the second numerical value.

Figure 6:
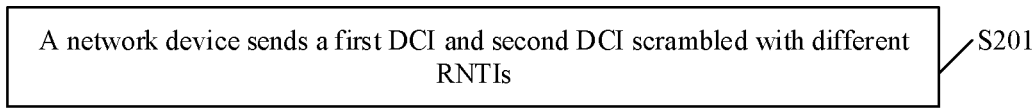
FIG. 6 is an optional processing flowchart of a method for data transmission applied to a network device according to an embodiment of the disclosure.

As shown in FIG. 6, a processing flow of a method for data transmission applied to a network device in an embodiment of the disclosure includes the following operation.

At block S201, the network device sends a first and second DCI scrambled with different RNTIs.

In the embodiment of the disclosure, descriptions about the RNTIs, the first DCI, the second DCI, the first resource region scheduled by the first DCI, the second resource region scheduled by the second DCI, the first resource allocation information and the second resource allocation information are the same as the descriptions in the method for data transmission applied to the terminal device, and elaborations are omitted herein.

The embodiment of the disclosure also provides a method for data transmission applied to a network device. A processing flow of the method is similar to the processing flow shown in FIG. 6. A difference is that, before S201, the method further includes the following operation.

At block S200, the network device sends a first configuration information to a terminal device.

In the embodiment of the disclosure, descriptions about the first configuration information are the same as those in S100, and elaborations are omitted herein.

For example, the first resource region and the second resource region are frequency-domain resource regions. The terminal device receives the first DCI scrambled by the network device with an RNTI 1. The first DCI includes the first resource allocation information for a first channel and the first resource allocation information indicates the first resource region. The terminal device also receives the second DCI scrambled by the network device with an RNTI 2. The second DCI includes the second resource allocation information for the first channel and the second resource allocation information indicates the second resource region.

Figure 7:
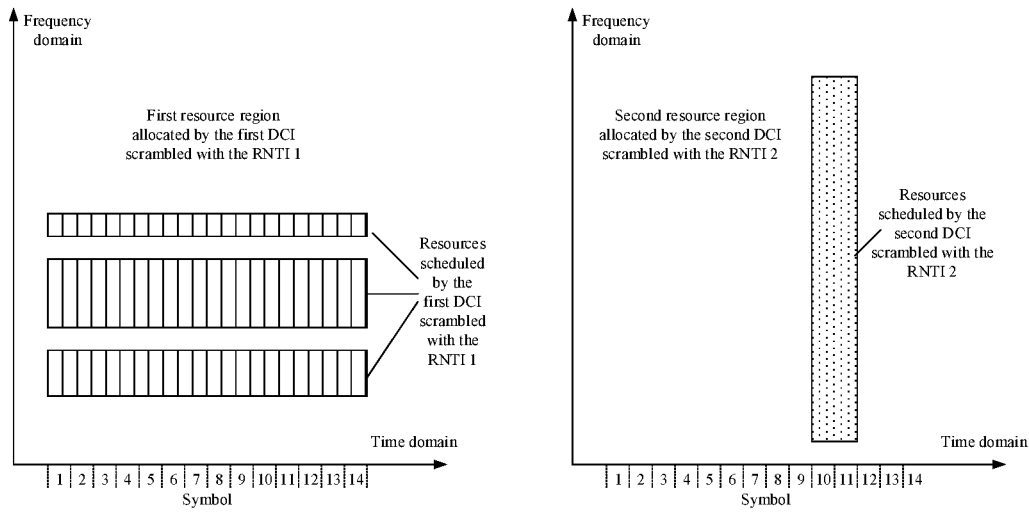
FIG. 7 is a schematic diagram of a first resource region and a second resource region that are frequency-domain resources according to an embodiment of the disclosure.
Figure 8:
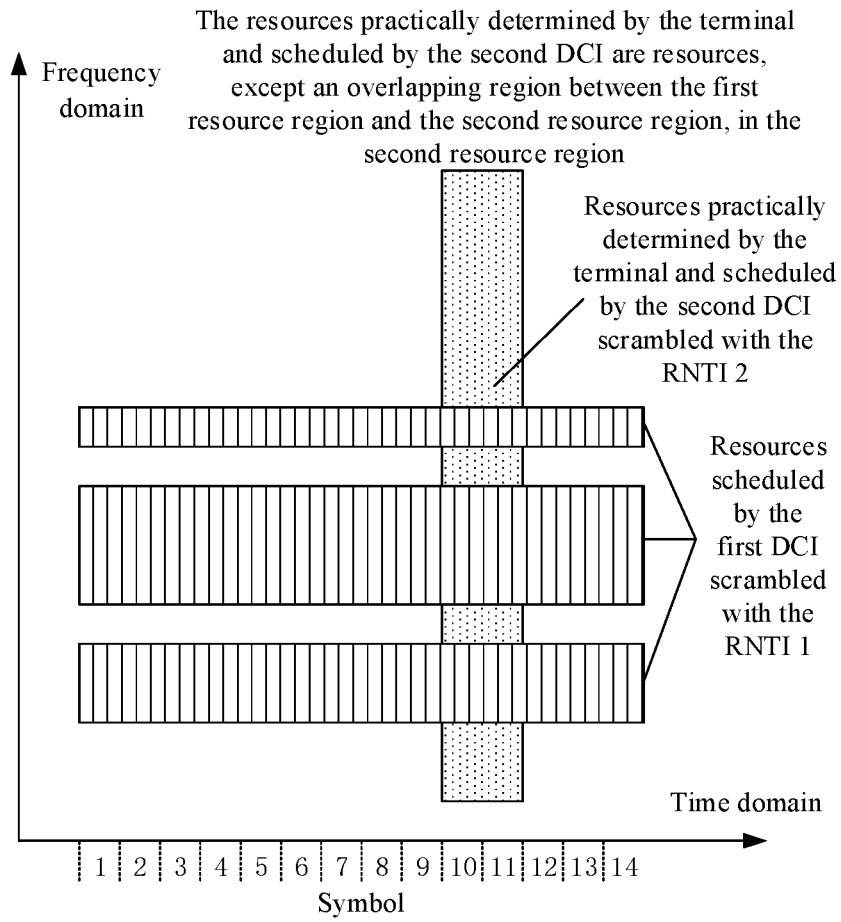
FIG. 8 is an optional schematic diagram showing a terminal device determining a transmission resource for a channel scheduled by second DCI according to an embodiment of the disclosure.

As shown in FIG. 7, part of frequency-domain resources of the first resource region and the second resource region overlap in a symbol 10 to a symbol 11. In the embodiment, as shown in FIG. 8, the terminal device determines that a transmission resource for a PDSCH or PUSCH or PUCCH scheduled by the second DCI is in a resource region, except an overlapping resource region between the first resource region and the second resource region, in the second resource region.

Figure 9:
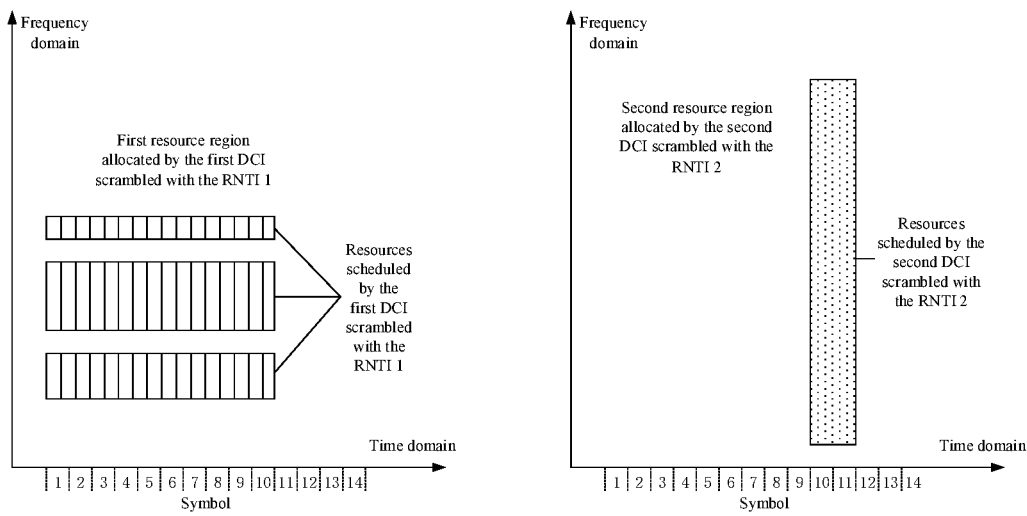
FIG. 9 is a schematic diagram of a first resource region and a second resource region that are time-frequency domain resources according to an embodiment of the disclosure.
Figure 10:
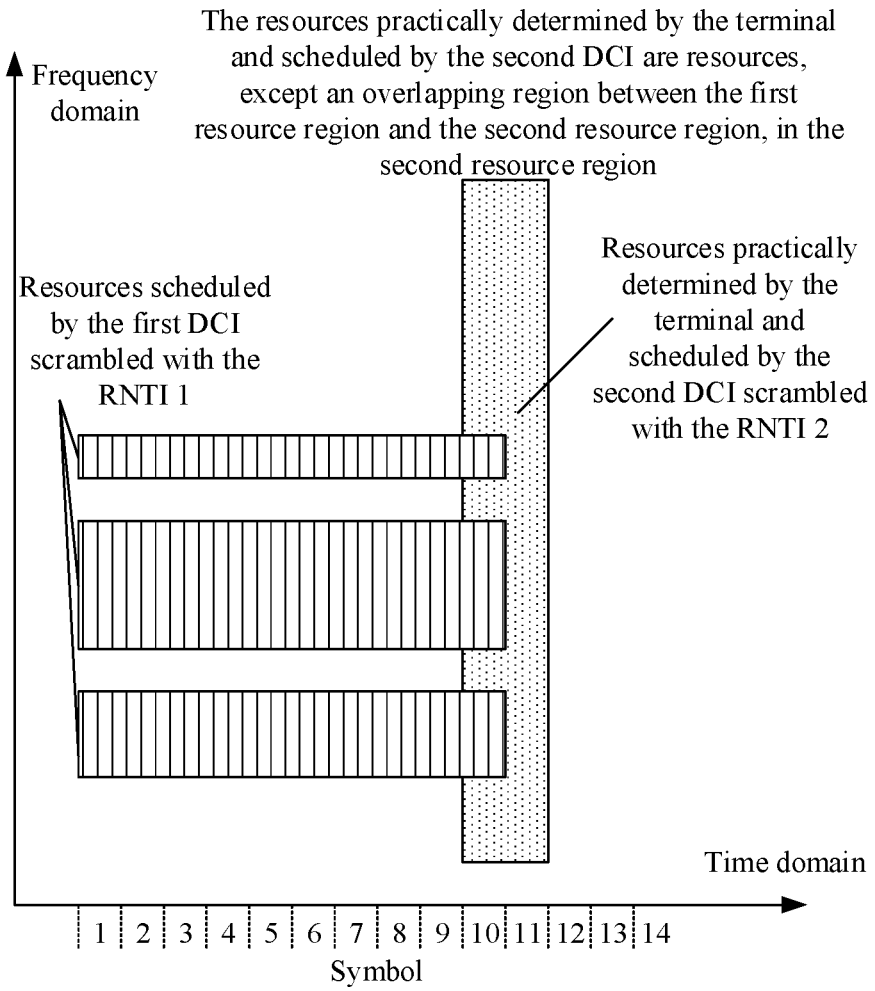
FIG. 10 is another optional schematic diagram showing a terminal device determining a transmission resource for a channel scheduled by second DCI according to an embodiment of the disclosure.

For example, the first resource region and the second resource region are time-frequency domain resource regions. The terminal device receives the first DCI scrambled by the network device with the RNTI 1. The first DCI includes the first resource allocation information for the first channel and the first resource allocation information indicates the first resource region. The terminal device also receives the second DCI scrambled by the network device with the RNTI 2. The second DCI includes the second resource allocation information for the first channel and the second resource allocation information indicates the second resource region. As shown in FIG. 9, part of frequency-domain resources of the first resource region and the second resource region overlap in the symbol 10, and no frequency-domain resources overlap in the symbol 11. In the embodiment, as shown in FIG. 10, the terminal device determines that the transmission resource for the PDSCH or PUSCH or PUCCH scheduled by the second DCI is in the resource region, except the overlapping resource region between the first resource region and the second resource region, in the second resource region.

It can be seen based on the embodiments shown in FIG. 7 to FIG. 10 that, when the first resource region is configured for the eMBB service and the second resource region is configured for the URLLC service, the transmission resource for the channel scheduled by the second DCI is in the resource region, except the overlapping resource region between the first resource region and the second resource region, in the second resource region. It can be understood that the overlapping resource region between the first resource region and the second resource region is not allocated to the URLLC service, such that resources allocated to the URLLC service are continuous resources. There are no overlapping resources among resources finally determined to be allocated to the URLLC service and the eMBB service by the terminal device, so that the URLLC service is not required to preempt the resource for the eMBB service, damage to a coded block of the eMBB service due to preemption of the resource for the eMBB service is avoided, and correspondingly, reduction in quality of the data transmission and reliability of the eMBB service is also avoided.

Figure 11:
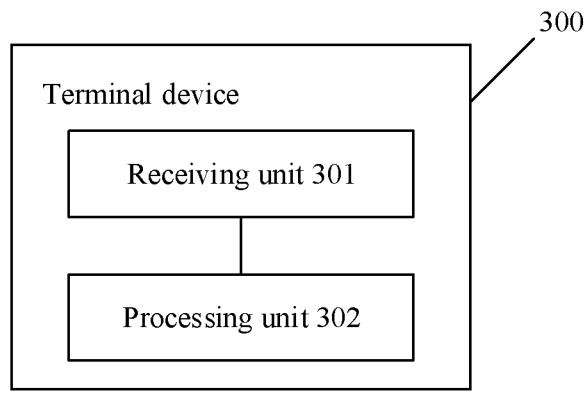
FIG. 11 is a composition structure diagram of a terminal device according to an embodiment of the disclosure.

An embodiment of the disclosure also provides a terminal device. FIG. 11 shows a composition structure of the terminal device. The terminal device 300 includes a receiving unit 301 and a processing unit 302.

The receiving unit 301 is configured to receive a first and second DCI scrambled with different RNTIs. The first DCI includes a first resource allocation information for a first channel, and the first resource allocation information indicates a first resource region. The second DCI includes a second resource allocation information for the first channel and the second resource allocation information indicates a second resource region.

The processing unit 302 is configured to determine to transmit the first channel scheduled by the second DCI in a third region resource. The third resource region is a resource region, except an overlapping resource region between the first resource region and the second resource region, in the second resource region.

In the embodiment of the disclosure, the first resource region, the second resource region and the third resource region are frequency-domain resource regions. Alternatively, the first resource region, the second resource region and the third resource region are time-frequency domain resource regions. A starting transmission time of the first channel scheduled by the first DCI is earlier than a starting transmission time of the first channel scheduled by the second DCI. A frequency-domain allocation unit adopted for the second resource allocation information is larger than a frequency-domain allocation unit adopted for the first resource allocation information. A first resource allocation manner is adopted for the first resource allocation information, and the first resource allocation manner is used to allocate continuous frequency-domain resources or discontinuous frequency-domain resources. A second resource allocation manner is adopted for the second resource allocation information, and the second resource allocation manner is used to allocate continuous frequency-domain resources. In an optional implementation, the first resource region scheduled by the first DCI is allocated to an eMBB service, and the second resource region scheduled by the second DCI is allocated to a URLLC service.

In the embodiment of the disclosure, the first channel is a PDSCH, or a PUSCH or a PUCCH. The first DCI and the second DCI are DCI for scheduling downlink resources, or the first DCI and the second DCI are DCI for scheduling uplink resources.

Correspondingly, the processing unit 302 is configured to determine to receive the PDSCH in the third resource region or is configured to determine to send the PUSCH or the PUCCH in the third resource region.

The first DCI is scrambled with a C-RNTI, and the second DCI is scrambled with an RNTI except the C-RNTI.

In the embodiment of the disclosure, the receiving unit 301 is further configured to receive a first configuration information from a network device. The first configuration information indicates that the RNTI for scrambling the second DCI is available. When a value in the first configuration information is a first numerical value, it is indicated that the RNTI for scrambling the second DCI is unavailable. When the value in the first configuration information is a second numerical value, it is indicated that the RNTI for scrambling the second DCI is available.

Figure 12:
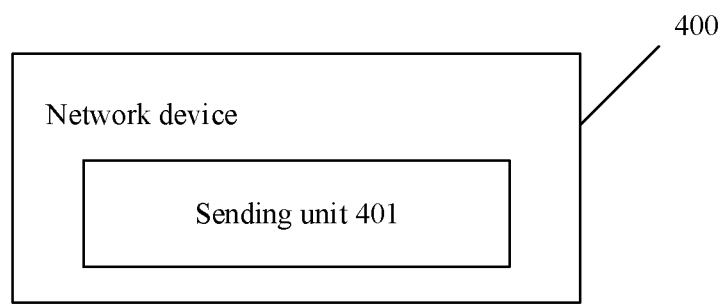
FIG. 12 is a composition structure diagram of a network device according to an embodiment of the disclosure.

An embodiment of the disclosure also provides a network device. FIG. 12 shows a composition structure of the network device. The network device 400 includes a sending unit 401.

The sending unit 401 is configured to send a first and second DCI scrambled with different RNTIs. The first DCI and the second DCI are used for a terminal device to determine a resource adopted to transmit a first channel scheduled by the second DCI. The first DCI includes a first resource allocation information for the first channel, and the first resource allocation information indicates a first resource region. The second DCI includes a second resource allocation information for the first channel, and the second resource allocation information indicates a second resource region.

In the embodiment of the disclosure, the first resource region, the second resource region and the third resource region are frequency-domain resource regions. Alternatively, the first resource region, the second resource region and the third resource region are time-frequency domain resource regions. A starting transmission time of the first channel scheduled by the first DCI is earlier than a starting transmission time of the first channel scheduled by the second DCI. A frequency-domain allocation unit adopted for the second resource allocation information is larger than a frequency-domain allocation unit adopted for the first resource allocation information. A first resource allocation manner is adopted for the first resource allocation information, and the first resource allocation manner is used to allocate continuous frequency-domain resources or discontinuous frequency-domain resources. A second resource allocation manner is adopted for the second resource allocation information, and the second resource allocation manner is used to allocate continuous frequency-domain resources. In an optional implementation, the first resource region scheduled by the first DCI is allocated to an eMBB service, and the second resource region scheduled by the second DCI is allocated to a URLLC service.

In the embodiment of the disclosure, the first channel is a PDSCH, or a PUSCH or a PUCCH. The first DCI and the second DCI are DCI for scheduling downlink resources, or the first DCI and the second DCI are DCI for scheduling uplink resources.

In the embodiment of the disclosure, the sending unit 401 is further configured to send a first configuration information to the terminal device. The first configuration information indicates that the RNTI for scrambling the second DCI is available. When a value in the first configuration information is a first numerical value, it is indicated that the RNTI for scrambling the second DCI is unavailable. When the value in the first configuration information is a second numerical value, it is indicated that the RNTI for scrambling the second DCI is available.

An embodiment of the disclosure also provides a terminal device, which includes a processor and a memory for storing a computer program capable of running in the processor. The processor is configured to run the computer program to execute the steps of the method for data transmission executed by the terminal device.

An embodiment of the disclosure also provides a network device, which includes a processor and a memory for storing a computer program capable of running in the processor. The processor is configured to run the computer program to execute the steps of the method for data transmission executed by the network device.

According to the method for data transmission, terminal device and network device provided in the embodiments of the disclosure, the terminal device receives the first DCI and second DCI scrambled with different RNTIs. Due to the first DCI, the second DCI and such a determination that the resource region for transmission of the first channel scheduled by the second DCI is a resource region, except the first resource region corresponding to the first DCI, in the second resource region corresponding to the second DCI, the overlapping resource region between the second resource region corresponding to the second DCI and the first resource region corresponding to the first DCI is configured for scheduling of the second DCI. In such a manner, resource waste caused by the fact that, when the overlapping resource region is scheduled by both the first DCI and the second DCI and after part of the overlapping resource region is scheduled by the first DCI, the left overlapping resource region may not be fully scheduled by the second DCI is avoided, and moreover, the problems of low reliability and low efficiency in data transmission in the first resource region scheduled by the first DCI after the overlapping resource region is preempted by the second DCI are solved. Therefore, through the method for data transmission provided in the embodiments of the disclosure, effective resource utilization may be implemented, and the efficiency and reliability in the data transmission may be improved.

Figure 13:
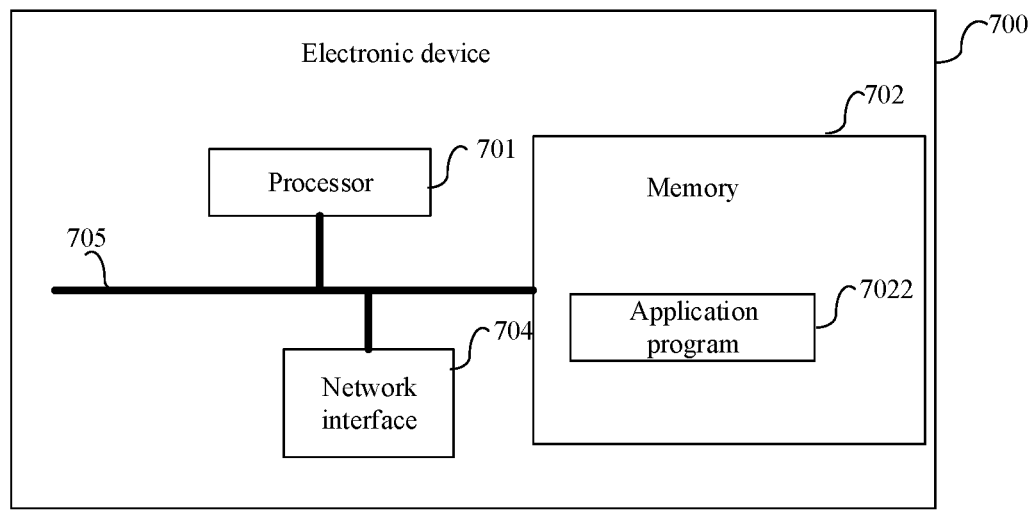
FIG. 13 is a hardware composition structure diagram of an electronic device according to an embodiment of the disclosure.

FIG. 13 is a hardware composition structure diagram of an electronic device (a network device or UE) according to an embodiment of the disclosure. The electronic device 700 includes at least one processor 701, a memory 702 and at least one network interface 704. Each component in the electronic device 700 is coupled together through a bus system 705. It can be understood that the bus system 705 is used to implement connection communication between these components. The bus system 705 includes a data bus and further includes a power bus, a control bus and a state signal bus. However, for clear description, various buses in FIG. 13 are marked as the bus system 705.

It can be understood that the memory 702 may be a volatile memory or a nonvolatile memory, and may also include both of the volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, a compact disc or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory 702 described in the embodiment of the disclosure is intended to include, but not limited to, memories of these and any other proper types.

In the embodiment of the disclosure, the memory 702 is configured to store various types of data to support the operation of the electronic device 700. Examples of the data include any computer program, for example, an application program 7022, operated in the electronic device 700. A program for implementing the method in the embodiments of the disclosure may be included in the application program 7022.

The method disclosed in the embodiments of the disclosure may be applied to the processor 701 or implemented by the processor 701. The processor 701 may be an integrated circuit chip with a signal processing capability. In an implementation process, each step in the method may be completed by an integrated logic circuit in a hardware form in the processor 701 or an instruction in a software form. The processor 701 may be a universal processor, a Digital Signal Processor (DSP) or another Programmable Logic Device (PLD), a discrete gate or transistor logic device, a discrete hardware component and the like. The processor 701 may implement or execute each method, step and logical block diagram disclosed in the embodiments of the disclosure. The universal processor may be a microprocessor, any conventional processor or the like. The steps of the method disclosed in combination with the embodiments of the disclosure may be directly embodied to be executed and completed by a hardware decoding processor or executed and completed by a combination of hardware and software modules in the decoding processor. The software module may be located in a storage medium, and the storage medium is located in the memory 702. The processor 701 reads information in the memory 702 and completes the steps of the method in combination with hardware.

In an exemplary embodiment, the electronic device 700 may be implemented by one or more Application Specific Integrated Circuits (ASICs), DSPs, PLDs, Complex Programmable Logic Devices (CPLDs), Field Programmable Gate Arrays (FPGAs), universal processors, controllers, Micro Controller Units (MCUs), Microprocessor Units (MPUs) or other electronic components, and is configured to execute the abovementioned method.

The embodiments of the disclosure also provide a computer-readable storage medium, which is used for storing a computer program.

Optionally, the computer-readable storage medium may be applied to a network device in the embodiments of the disclosure, and the computer program enables a computer to execute corresponding flows implemented by the network device in each method in the embodiments of the disclosure. For simplicity, elaborations are omitted herein.

Optionally, the computer-readable storage medium may be applied to a terminal device in the embodiments of the disclosure, and the computer program enables a computer to execute corresponding flows implemented by the terminal device in each method in the embodiments of the disclosure. For simplicity, elaborations are omitted herein.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for implementing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including instruction means may be generated by the instructions stored in the computer-readable memory, the instruction means realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

Described above are merely the preferred embodiments of the disclosure and not intended to limit the scope of protection of the disclosure. Any modifications, equivalent replacements, improvements and the like made within the spirit and principle of the disclosure shall fall within the scope of protection of the disclosure.

The invention claimed is:

1. A method for data transmission, comprising:
 receiving, by a terminal device, a first Downlink Control Information (DCI) and second DCI scrambled with different Radio Network Temporary Identities (RNTIs), the first DCI comprising a first resource allocation information for a first channel, the first resource allocation information indicating a first resource region, the second DCI comprising a second resource allocation information for the first channel and the second resource allocation information indicating a second resource region; and
 determining to transmit, by the terminal device, the first channel scheduled by the second DCI in a third region resource, the third resource region being a resource region, except an overlapping resource region between the first resource region and the second resource region, in the second resource region
 wherein a frequency-domain allocation unit adopted for the second resource allocation information is larger than a frequency-domain allocation unit adopted for the first resource allocation information, the first resource region indicated in the first resource allocation information is used for transmitting a first service, and the second resource region indicated in the second resource allocation information is used for transmitting a second service.

2. The method of claim 1, wherein the first resource region, the second resource region and the third resource region are frequency-domain resource regions.

3. The method of claim 1, wherein the first resource region, the second resource region and the third resource region are time-frequency domain resource regions.

4. The method of claim 1, wherein a starting transmission time of the first channel scheduled by the first DCI is earlier than a starting transmission time of the first channel scheduled by the second DCI.

5. The method of claim 1, wherein a first resource allocation manner is adopted for the first resource allocation information, and the first resource allocation manner is used to allocate continuous frequency-domain resources or discontinuous frequency-domain resources; and
 a second resource allocation manner is adopted for the second resource allocation information, and the second resource allocation manner is used to allocate continuous frequency-domain resources.

6. The method of claim 1, wherein the first channel is a Physical Downlink Shared Channel (PDSCH), or a Physical Uplink Shared Channel (PUSCH) or a Physical Uplink Control Channel (PUCCH).

7. A terminal device, comprising:
 a processor;
 a memory for storing a computer program executable by the processor; and
 a network interface,
 wherein the processor is configured to run the computer program to:
  control the network interface to receive a first Downlink Control Information (DCI) and second DCI scrambled with different Radio Network Temporary Identities (RNTIs), the first DCI comprising a first resource allocation information for a first channel, the first resource allocation information indicating a first resource region, the second DCI comprising a second resource allocation information for the first channel and the second resource allocation information indicating a second resource region; and determine to transmit the first channel scheduled by the second DCI in a third region resource, the third resource region being a resource region, except an overlapping resource region between the first resource region and the second resource region, in the second resource region, wherein a frequency-domain allocation unit adopted for the second resource allocation information is larger than a frequency-domain allocation unit adopted for the first resource allocation information, the first resource region indicated in the first resource allocation information is used for transmitting a first service, and the second resource region indicated in the second resource allocation information is used for transmitting a second service.

8. The terminal device of claim 7, wherein the first resource region, the second resource region and the third resource region are frequency-domain resource regions.

9. The terminal device of claim 7, wherein the first resource region, the second resource region and the third resource region are time-frequency domain resource regions.

10. The terminal device of claim 7, wherein a starting transmission time of the first channel scheduled by the first DCI is earlier than a starting transmission time of the first channel scheduled by the second DCI.

11. The terminal device of claim 7, wherein a first resource allocation manner is adopted for the first resource allocation information, and the first resource allocation manner is used to allocate continuous frequency-domain resources or discontinuous frequency-domain resources; and a second resource allocation manner is adopted for the second resource allocation information, and the second resource allocation manner is used to allocate continuous frequency-domain resources.

12. The terminal device of claim 7, wherein the first channel is a Physical Downlink Shared Channel (PDSCH), or a Physical Uplink Shared Channel (PUSCH) or a Physical Uplink Control Channel (PUCCH).

13. A network device, comprising:
a processor;
a memory for storing a computer program executable by the processor; and
a network interface,
wherein the processor is configured to run the computer program to:
control the network interface to send a first Downlink Control Information (DCI) and second DCI scrambled with different Radio Network Temporary Identities (RNTIs), wherein the first DCI and the second DCI are used for a terminal device to determine a resource adopted to transmit a first channel scheduled by the second DCI;

the first DCI comprises a first resource allocation information for the first channel, and the first resource allocation information indicates a first resource region; and the second DCI comprises a second resource allocation information for the first channel, and the second resource allocation information indicates a second resource region, wherein a frequency-domain allocation unit adopted for the second resource allocation information is larger than a frequency-domain allocation unit adopted for the first resource allocation information, the first resource region indicated in the first resource allocation information is used for transmitting a first service, and the second resource region indicated in the second resource allocation information is used for transmitting a second service.

14. The network device of claim 13, wherein the first resource region and the second resource region are frequency-domain resource regions, or
the first resource region and the second resource region are time-frequency domain resource regions.

15. The network device of claim 13, wherein a starting transmission time of the first channel scheduled by the first DCI is earlier than a starting transmission time of the first channel scheduled by the second DCI.

16. The network device of claim 13, wherein a first resource allocation manner is adopted for the first resource allocation information, and the first resource allocation manner is used to allocate continuous frequency-domain resources or discontinuous frequency-domain resources; and a second resource allocation manner is adopted for the second resource allocation information, and the second resource allocation manner is used to allocate continuous frequency-domain resources.

17. The network device of claim 13, wherein the first channel is a Physical Downlink Shared Channel (PDSCH), or a Physical Uplink Shared Channel (PUSCH) or a Physical Uplink Control Channel (PUCCH).

* * * * *